Patented Nov. 3, 1936

2,059,425

UNITED STATES PATENT OFFICE 2,059,425

FILAMENTS, FILMS AND THE LIKE, AND METHOD OF MAKING THE SAME

William Whitehead, Cumberland, Md., assignor to Celanese Corporation of America, a corporation of Delaware No Drawing. Application September 14, 1932, Serial No. 633,118

9 Claims. (Cl. 18—54)

This invention relates to the preparation of artificial products and relates more particularly to the manufacture of textile materials, films and other products containing organic derivatives of cellulose.

An object of my invention is to prepare yarns, filaments and other products containing organic derivatives of cellulose which have a subdued lustre or which are capable of having a subdued lustre imparted thereto.

Often it is desired to prepare filaments, yarns and like products which have a subdued lustre. For this purpose it has been proposed to incorporate finely divided insoluble pigment-like material in the spinning solutions from which the filaments are formed. However this involves the introduction of a foreign material into such filaments, which for some purposes it is desirable to avoid. Moreover the grinding of such pigments to the required fine particle size is a tedious and prolonged process.

I have found that if a finely divided sugar or metallic compound of sugar that is not soluble in the solvent of the solution is incorporated in a solution of a derivative of cellulose, the filaments, films or other products made therefrom are capable of being readily delustered by the removal of such sugar or its compound by treatment with water or other solvent for the same.

The use of sugars for this purpose is attended with many important advantages. These sugars, provided they are dry, grind very readily and are easily dispersed in the derivative of cellulose solutions to form stable suspensions. The sugars do not corrode the spinning or other apparatus with which they come in contact, their use does not interfere with the strength or dyeing properties of the products formed, and the products formed from solutions containing them retain their subdued lustre even when dyed black or in other dark shades.

In accordance with my invention, I prepare artificial products containing derivatives of cellulose by incorporating in a solution of a derivative of cellulose a finely divided sugar or a metallic compound of sugar which is not soluble or only slightly soluble in the solvent of such solution, and then forming desired products therefrom. The products so formed may be treated with an aqueous liquid or other material for removing at least part of such water-soluble finely divided substance, whereby the subdued lustre is imparted to the same. The solutions thus formed may be formed into articles such as filaments, yarns, artificial bristles or straws, films, foils and the like.

Any suitable derivative of celulose may be employed such as organic esters of cellulose and cellulose ethers. Examples of organic esters of cellulose are cellulose acetate, cellulose formate, cellulose propionate and cellulose butyrate while examples of cellulose ethers are ethyl cellulose, methyl cellulose and benzyl cellulose.

The organic derivative of cellulose is dissolved in a suitable solvent or solvent mixture such as acetone, a mixture of chloroform and ethyl or methyl alcohol, mixtures of ethylene dichloride and ethyl or methyl alcohol, mixtures of methylene chloride and ethyl or methyl alcohol, etc. If desired other and higher boiling solvents such as ethyl lactate, diacetone alcohol, etc., may also be added to the solution, and in some cases plasticizers such as dibutyl tartrate or diethyl phthalate may be added to the solution.

Any suitable sugar or metallic compound thereof that is soluble in water may be incorporated in finely divided form in the solution of the derivative of cellulose, provided it is insoluble or only very slightly soluble in the solvent of such solution.

Examples of sugars that may be employed are cane sugar, beet sugar or other sucroses; glucose, dextrose, fructose, galactose or other hexoses; maltose, lactose or other disaccharides; raffinose or other trisaccharides; pentoses, etc. Metallic compounds of these sugars, such as the glucosates, fructosates or sucrates of calcium or strontium or barium may be employed instead of or in addition to the sugars.

In order to obtain fine grinding and dispersion of the sugars or their compounds, it is important that they be substantially dry. Thus if cane sugar is dissolved in a small quantity of water and this solution is mixed with anhydrous acetone, the aqueous solution of sugar remains as a separate phase. On the other hand, if the dry finely milled sugar is dispersed in acetone containing as much as 10% of water, the cane sugar remains undissolved in this aqueous acetone.

Generally the amount of sugar added is from 0.5 to 10%, say 2 to 5% of the weight of the cellulose compound present in the finished yarn. The sugar is preferably in very fine form, the particles having a diameter of between 0.1 and 5 microns and preferably less than 1 or 2 microns for increased covering power. This fine size may be attained by grinding the sugar either with the solvent or part of the spinning solution used in the spinning solution in a ball mill, roller mill or colloid mill. The ground material is then added to the solution of the derivative of cellulose and to which may also be added diethylene glycol, heavy white mineral oil, olive oil, castor oil or other oils. The spinning solution containing the sugar is then preferably thoroughly mixed and subjected to the usual filtration before spinning. However the addition of the sugar to the spinning dope at any stage of the filtration process or even after completion of filtration is not excluded.

Filaments or yarns may be made by extruding the solution of the derivative of cellulose containing the finely divided sugar through fine orifices into an evaporative atmosphere, as in dry spinning. If a wet spinning method is employed and the precipitating bath contains water or other solvent for the sugar, the sugar may be removed from the filaments during the setting operation. If the precipitating bath of the wet spinning process consists of a liquid, such as kerosene, that has no solvent action on the sugar, the same will remain in the filaments and may be subsequently removed by scouring.

Filaments or yarns made by a dry spinning process or by a wet spinning process wherein the coagulating bath is not a solvent for the sugar have substantially the same lustre as those formed from similar solutions not containing the finely divided sugar.

In order to impart a subdued lustre to the filaments, yarns or other products containing the finely divided sugar or its metallic compound, they are treated with a substance such as water or aqueous liquid adapted to remove or dissolve out the finely divided particles of sugar. Treatment with water or aqueous liquid at ordinary temperatures is sufficient for this purpose although the action is more rapid at higher temperatures. This treatment with aqueous liquids to remove the sugar may be accomplished during dyeing, scouring or other finishing treatment of the yarns, fabrics or articles made from such solutions.

The removal of the finely divided sugar or its metallic compound from the filaments, yarns or other artificial materials leaves minute holes or pores in the same which imparts to it a beautiful subdued lustre. Even when fabrics, yarns, etc. made in this manner are dyed in black or dark shades, the subdued lustre persists.

Yarns or fabrics made of cellulose acetate or other organic ester of cellulose containing the finely divided sugar when treated with alkaline solutions to saponify the same partially or wholly, have imparted a subdued lustre which is relatively permanent even when ironed while damp.

In order further to illustrate my invention but without being limited thereto, the following specific example is given.

Substantially dry cane sugar is milled in anhydrous acetone in a ball mill for about 20 hours by which treatment it is milled down to particle sizes of 1 micron or less. Towards the end of milling a little cellulose acetate, such as 5% on the weight of the acetone, is added to act in the capacity of a protective colloid and stabilize the dispersion of the sugar in the acetone. The resulting dispersion is added to a solution of cellulose acetate in aqueous acetone of such concentration and in such amount that there is formed a spinning solution having the following composition:

| | Parts by weight |
|---|---|
| Acetone soluble cellulose acetate | 25 |
| Solvent comprising 95% acetone and 5% water | 74 |
| Cane sugar | 1 |

The solution is filtered and extruded through fine orifices into a drying evaporative atmosphere. The yarn formed has very nearly the normal lustrous and transparent appearance. However on scouring at any temperature with or without soap or other reagent, the cane sugar diffuses from the yarn leaving a porous dull matte yarn. The yarn retains a considerable amount of its dullness even when dyed very dark shades such as black.

It is to be understood that the foregoing detailed description is given merely by way of illustration and that many variations may be made therein without departing from the spirit of my invention.

Having described my invention, what I desire to secure by Letters Patent is:

1. Artificial products comprising a derivative of cellulose having distributed therein finely divided particles of a substance selected from the group consisting of sugars and their metallic compounds.

2. Artificial products comprising cellulose acetate having distributed therein finely divided particles of a substance selected from the group consisting of sugars and their metallic compounds.

3. Artificial filaments or yarns comprising an organic derivative of cellulose and having finely divided particles of a sugar distributed therein.

4. Artificial filaments or yarns comprising cellulose acetate and having finely divided particles of a sugar distributed therein.

5. Artificial filaments or yarns comprising cellulose acetate and having finely divided particles of a diameter of less than 5 microns of a sugar distributed therein.

6. Process for the production of artificial filaments, yarns and like products which are readily delustered by scouring, which comprises forming a solution of an organic derivative of cellulose in an organic solvent, incorporating in the solution a finely divided substance selected from the group consisting of sugars and their metal compounds which are substantially insoluble in the organic solvent, and extruding the solution into a setting medium.

7. Process for the production of artificial filaments, yarns and like products which are readily delustered by scouring, which comprises forming a solution of cellulose acetate in an organic solvent, incorporating in the solution a finely divided substance selected from the group consisting of sugars and their metal compounds which are substantially insoluble in the organic solvent, and extruding the solution into a setting medium.

8. Process for the production of artificial filaments, threads, films and the like which are readily delustered by scouring, which comprises forming a solution of cellulose acetate in acetone, incorporating in the solution a finely divided substance selected from the group consisting of sugars and their metal compounds which are substantially insoluble in acetone, and extruding the solution into a setting medium.

9. Process for the production of artificial filaments, yarns and like products which are readily delustered by scouring, which comprises forming a solution of cellulose acetate in acetone, incorporating cane sugar in the solution, and extruding the solution into a setting medium.

WILLIAM WHITEHEAD.